Figures 1, 2:
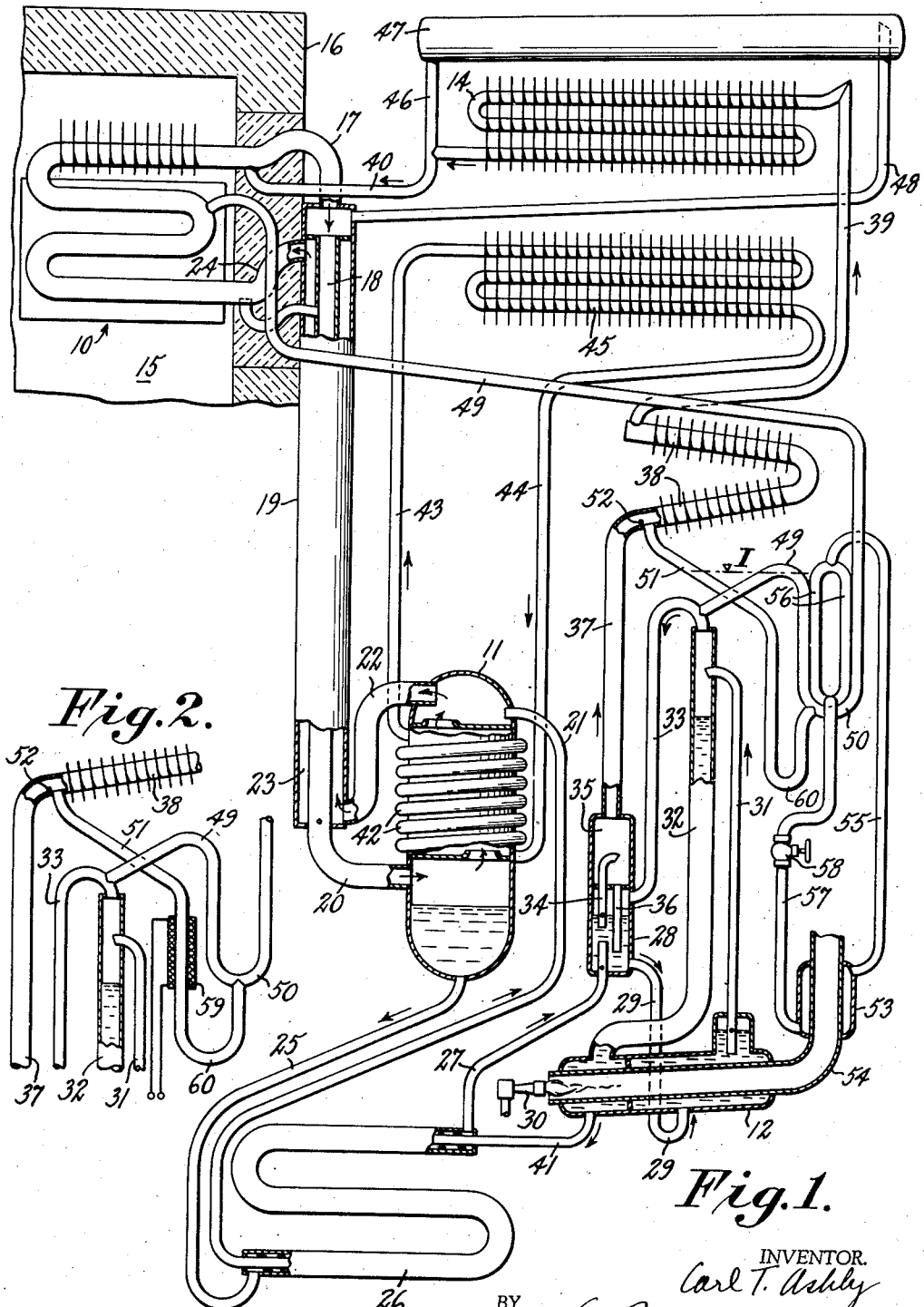

June 9, 1942.  C. T. ASHBY  2,285,884

REFRIGERATION

Filed Nov. 27, 1939

INVENTOR.
Carl T. Ashby
BY
his ATTORNEY.

Patented June 9, 1942

2,285,884

UNITED STATES PATENT OFFICE 2,285,884

REFRIGERATION

Carl T. Ashby, Evansville, Ind., assignor to Servel, Inc., New York, N. Y., a corporation of Delaware Application November 27, 1939, Serial No. 306,258

15 Claims. (Cl. 62—119.5)

My invention relates to refrigeration, and more particularly to a refrigeration system employing evaporation of refrigerant fluid in the presence of an inert gas or auxiliary agent.

It is an object of the invention to provide an improvement for controlling refrigeration systems of this type, as to effect defrosting, for example, by causing flow of hot vapors in the system into an evaporator or cooling element. I accomplish this by providing a first path of flow for refrigerant fluid from a place of vapor expulsion to a place of condensation in which refrigerant is liquefied and from which liquid flows to the cooling element, and a second path of flow through which hot vapor flows from the place of vapor expulsion to the cooling element. A liquid trap is provided in the second path of flow, and, when liquid is removed from the trap, hot vapor can flow into the cooling element to effect rapid defrosting. An important feature of the invention is that the second path of flow is connected in the refrigeration system in such a manner that when hot vapor is flowing to the cooling element from the place of vapor expulsion, all of the vapor passes through the second path of flow and no flow of vapor takes place in the first path of flow. Further, the liquid trap in the second path of flow is arranged to receive liquid from a rectifier or other suitable place in the system to insure an effective liquid seal when it is desired to cause all of the refrigerant fluid to flow through the first path of flow to the place of condensation and from the latter to the cooling element for evaporation therein.

The invention, together with the above and other objects and advantages thereof, will be more fully understood upon reference to the following description and the accompanying drawing forming a part of this specification, and of which Fig. 1 illustrates more or less diagrammatically a refrigeration system embodying the invention; and Fig. 2 is a fragmentary view illustrating another embodiment of the invention.

In the drawing I have shown the invention embodied in an absorption refrigeration system of a uniform pressure type containing a pressure equalizing gas or auxiliary agent. A system of this type includes an evaporator or cooling element 10, an absorber 11, a generator 12 and a condenser 14 which are interconnected in a manner well known in the art and which will be briefly described hereinafter. The system contains a solution of refrigerant and absorption liquid, and also a pressure equalizing gas or auxiliary agent which is inert with respect to the refrigerant and absorption liquid. Although I do not wish to be limited thereto, the refrigerant and absorption liquid may be ammonia and water, respectively, and the inert gas or auxiliary agent may be hydrogen.

In Fig. 1 the cooling element or evaporator 10 is disposed in an enclosed space 15 which may form a food storage compartment of a thermally insulated cabinet 16, only a portion of which is shown. Refrigerant fluid evaporates in cooling element 10 and diffuses into the inert gas or auxiliary agent to produce a refrigerating effect. The resulting gas mixture of refrigerant and auxiliary agent flows from cooling element 10 through a conduit 17, inner passage 18 of a gas heat exchanger 19, and conduit 20 into the lower part of absorber 11.

In absorber 11 refrigerant vapor is absorbed by the absorption liquid which enters through a conduit 21. The auxiliary agent, which is practically insoluble and weak in refrigerant, flows through a conduit 22, outer passage 23 of gas heat exchanger 19 and conduit 24 into the lower part of cooling element 10.

The circulation of auxiliary agent or inert gas in the gas circuit just described is due to the difference in specific weight of column of auxiliary agent rich in refrigerant and flowing from the upper part of cooling element 10 to absorber 11 and the column of auxiliary agent weak in refrigerant vapor and flowing from absorber 11 to the lower part of cooling element 10. Since the column of auxiliary agent rich in refrigerant vapor is heavier than that weak in refrigerant vapor, a force is produced or developed for causing circulation of auxiliary agent through and between cooling element 10 and absorber 11.

Absorption liquid enriched in refrigerant flows from the lower part of absorber 11 through a conduit 25, outer passage of a liquid heat exchanger 26, conduit 27, analyzer 28 and conduit 29 into generator 12. The generator 12 is heated in any suitable manner, as by a gas burner 30, for example, whereby liquid is raised in the generator through a tube 31 by vapor liquid lift action and flows back to the generator through a standpipe 32. Refrigerant vapor is expelled from solution in generator 12 due to heating by burner 30, and this vapor, together with vapor entering through tube 31, flows through standpipe 32 and conduit 33 into analyzer 28. In analyzer 28 the expelled vapor flows through a vapor liquid lift tube 34 into an upper chamber 35 from which the raised liquid drains back through a tube 36.

From the upper chamber 35 of analyzer 28 the refrigerant vapor flows through a conduit 37, an air-cooled rectifier 38, and conduit 39 into the condenser 14. Refrigerant vapor is liquefied in condenser 14 and returned to cooling element 10 through conduit 40 to complete the refrigerating cycle.

The weakened absorption fluid from which refrigerant has been expelled flows from generator 12 through a conduit 41, inner passage of liquid heat exchanger 26, and conduit 21 to the upper part of absorber 11. This circulation of absorption liquid results from the raising of liquid through tube 31 by vapor liquid lift action.

The heat liberated with absorption of refrigerant vapor in absorber 11 is transferred to a suitable cooling medium which circulates through a coil 42 arranged in heat exchange relation with the absorber. The coil 42 is connected by conduits 43 and 44 to a looped coil 45 to form a closed circuit which is partly filled with a volatile liquid. The liquid evaporates in coil 42 taking up heat from absorber 11, and the vapor liquefies in looped coil 45 giving up heat to surrounding air.

The outlet end of condenser 14 is connected by a conduit 46, vessel 47 and conduit 48 to a part of the gas circuit, as at the upper end of gas heat exchanger 19, for example, so that any auxiliary agent which may pass through the condenser can flow into the gas circuit. Refrigerant vapor not liquefied in the condenser flows through conduit 46 to displace auxiliary agent in vessel 47 and force such agent through conduit 48 into the gas circuit. The effect of forcing auxiliary agent into the gas circuit in this manner is to increase the total pressure in the entire system to insure condensation of refrigerant vapor in condenser 14.

In accordance with my invention, in order to provide a path of flow for hot vapor from generator 12 to cooling element 10, a conduit 49 is connected at its lower end to the upper end of conduit 33. The conduit 49 is formed with a U-shaped portion to provide a liquid trap 50. From the trap 50 conduit 49 extends upwardly and is connected at its upper end to cooling element 10. The lower end of rectifier 38 is connected by a conduit 51 to the lower end of trap 50. The rectifier 38 may be provided with a baffle or dam 52 to direct liquid flowing downwardly in the rectifier through conduit 51 into the trap 50.

Although liquid in trap 50 may be heated in any suitable manner, I have shown a heat transfer system for transferring heat from generator 12 to the trap. The heat transfer system includes a jacket 53 disposed about a flue 54 of generator 10. The upper part of jacket 53 is connected by a conduit 55 to the upper part of an annular loop 56. The sides and lower portion of loop 56 are in good heat exchange relation with the legs and lower rounded portion of trap 50. The lower part of loop 56 is connected by a conduit 57 to the lower part of jacket 53. A control valve 58 is provided in conduit 57 to control transfer of heat to trap 50 by the heat transfer system.

The jacket 53, loop 56 and connecting conduits 55 and 57 form a closed fluid circuit which is partly filled with a suitable volatile liquid, such as methyl chloride, for example. Assuming that valve 58 is open, volatile liquid in jacket 53 is heated and vaporized, and the vapor flows through conduit 55 into loop 56 in which it is condensed. The condensate returns from loop 56 through conduit 57 to jacket 53 in which the liquid is again vaporized. The heating of liquid in jacket 53 takes up heat from the hot combustion gases flowing through flue 54, and condensation of the vapors in loop 56 gives up heat to liquid in trap 50 at a sufficient rate to cause vaporization of liquid in the latter. When valve 58 is closed, liquid is prevented from returning through conduit 57 to jacket 53 and transfer of heat from flue 54 to trap 50 ceases when jacket 53 is depleted of liquid.

During normal operation of the refrigeration system, assuming that trap 50 is filled with liquid and control valve 58 is closed, vapor expelled from solution in generator 12 flows through a first path of flow which includes conduit 33, analyzer 28, conduit 37, rectifier 38, conduit 39 and condenser 14. From condenser 14 liquid refrigerant continues to flow in this first path of flow through conduit 40 into cooling element 10 in which the liquid evaporates and diffuses into auxiliary agent to produce a refrigerating effect.

When vapor is expelled from solution in generator 12, some absorption liquid vapor accompanies the refrigerant vapor. In analyzer 28 the expelled vapor flows in intimate contact with rich absorption liquid in vapor liquid lift tube 34. Since the absorption liquid raised in tube 34 is enriched in refrigerant as a result of absorption of refrigerant in absorber 11, substantially no refrigerant vapor is absorbed by the enriched liquid in analyzer 28. However, absorption liquid vapor accompanying the refrigerant vapor is condensed and the raised liquid drains through tube 36 into the lower part of analyzer 28.

The refrigerant vapor, which has now been deprived to some extent of accompanying absorption liquid vapor, flows from analyzer 28 through conduit 37 into the air-cooled rectifier 38. In rectifier 38 absorption liquid vapor accompanying the refrigerant vapor is condensed. The absorption liquid vapor condenses at a higher temperature than the refrigerant vapor and the temperature of rectifier 38 is such that refrigerant vapor substantially deprived of accompanying absorption liquid vapor continues to flow through conduit 39 into condenser 14 in which it is condensed. The condensate formed in rectifier 38 flows through conduit 51 into trap 50, and, when the liquid level in this trap reaches the level I indicated in the drawing, liquid overflows through conduit 49 and returns to generator 12.

The temperature at which evaporation of refrigerant takes place in cooling element 10 is dependent upon the partial pressure of refrigerant vapor. During normal operation of the refrigeration system the partial pressure of refrigerant vapor in cooling element 10 is such that evaporation of liquid takes place at a temperature below the freezing temperature of water. The cooling element 10 being operated at this low temperature, a layer of frost or ice is formed thereon due to condensation of water vapor from air flowing in contact with the surfaces of the cooling element.

In order to melt the layer of frost or ice formed on the surfaces of cooling element 10, that is, to effect defrosting of the latter, liquid is removed from trap 50 to permit hot vapor to flow from the upper part of standpipe 32 through conduit 49 into cooling element 10. When this is done, the partial pressure of refrigerant vapor in the cooling element increases and the temperature of cooling element 10 rises above the freezing temperature of water. By flowing hot vapor in the system directly into cooling element 10 the frost or ice accumulated on the latter is melted very rapidly.

In the embodiment illustrated, liquid is removed from trap 50 by opening control valve 58. This permits liquid to flow through conduit 57 into jacket 53 whereby heat is transferred from a heated part of the system to trap 50 in the manner explained above. This removal of liquid in trap 50 may be effected entirely by evaporation of the liquid or by vapor liquid lift action. When the internal diameter of conduit 49 permits the vapor bubbles formed in trap 50 to pass liquid therein, removal of liquid is effected entirely by evaporation. On the other hand, when the internal diameter of conduit 49 is sufficiently small so that vapor bubbles cannot freely pass liquid in the trap, liquid is removed from the trap by vapor liquid lift action. Liquid is removed from the left-hand leg of trap 50 into the upper end of standpipe 32, and liquid in the right-hand leg of trap 50 is raised through conduit 49 into cooling element 10. Although liquid is removed from trap 50 to permit flow of hot vapor through conduit 49 to cooling element 10, sufficient liquid should remain in conduit 51 to prevent by-passing of hot vapor to rectifier 38 and thence to condenser 14. To insure blocking off flow of hot vapor through conduit 51 when liquid is removed from trap 50, the lower end of conduit 51 is U-shaped to form a trap 60. The trap 60 is of such size that sufficient liquid will always remain therein during the defrosting periods so that all of the hot vapor flowing through conduit 49 will pass directly into cooling element 10.

When cooling element 10 is defrosted, control valve 58 is closed whereby heat is no longer transferred to trap 50. With cessation of heat supply to trap 50, condensation of vapor will occur in the upper part of conduit 49 and such condensate drains back into trap 50 to fill the latter. If desired, a plurality of heat transfer fins may be provided at the upper portion of conduit 49 to aid in filling trap 50 with liquid to terminate a defrosting period. During normal operation of the system, liquid drains from rectifier 38 through conduit 51 into trap 50, as explained above. With this arrangement the liquid level in trap 50 is maintained sufficiently high so that, even with some evaporation of liquid in trap 50, the vapor expelled from solution in generator 12 cannot flow through conduit 49 during normal operation of the refrigeration system.

Instead of heating liquid in trap 50 to remove liquid therefrom, as described above in connection with the embodiment in Fig. 1, the liquid may be removed by heating conduit 51. Such an arrangement is shown in Fig. 2 which illustrates a portion of the system in Fig. 1 with similar parts referred to by the same reference numerals.

In Fig. 2 liquid in conduit 51 is arranged to be heated by an electrical heating element 59. During normal operation of the refrigeration system traps 50 and 60 are filled with liquid and no flow of hot vapor takes place through conduit 49. When it is desired to effect defrosting of cooling element 10 heating element 59 is connected to a suitable source of electrical energy whereby liquid in conduit 51 is heated and vapor bubbles are formed. The internal diameter of conduit 51 in Fig. 2 is sufficiently small so that the vapor bubbles cannot freely pass liquid whereby liquid is removed from trap 50 by lifting of liquid in conduit 51 by vapor liquid lift action. When the trap 50 is depleted of liquid hot vapor can flow through conduit 49 into cooling element 10 to cause rise in temperature of the latter and rapid melting of frost formed thereon.

The size and location of heating element 59 and the depth of trap 60 are such that sufficient liquid remains in trap 60 when heating element 59 is energized and cooling element 10 is being defrosted. By properly dimensioning these parts, therefore, all of the hot vapor flows through conduit 49 to cooling element 10 when liquid is removed from trap 50 and no vapor flows through conduit 51 due to the liquid remaining in trap 60.

The connection of the vapor by-pass conduit 49 to the upper end of conduit 33 is particularly advantageous in that all of the vapor will flow through conduit 49 into cooling element 10 when liquid is removed from trap 50. This is so because the liquid in analyzer 28 acts as a valve. In other words, when all of the liquid is removed from trap 50 there is substantially no resistance to flow of gas through by-pass conduit 49, while there is a small liquid head in analyzer 28 through which vapor must pass in order to flow through tube 34 into the upper chamber 35 and thence to condenser 14. When liquid is removed from trap 50, therefore, all of the vapor expelled from solution in generator 12 flows into cooling element 10 to effect rapid defrosting. On the other hand, the provision of returning condensate from rectifier 38 to trap 50 always insures maintaining a sufficient liquid head in trap 50 which is greater than that encountered by vapor in analyzer 28 so that flow of vapor through analyzer 28 is insured during normal operation of the refrigeration system.

While I have shown and described several embodiments of my invention, it will be apparent to those skilled in the art that modification and changes may be made without departing from the spirit and scope of the invention. Thus, liquid may be removed from trap 50 in Fig. 1 by direct application of heat to the trap without the aid of a heat transfer system and all of the hot vapor expelled from solution may be caused to flow into the cooling element by providing a liquid head in the system at a place other than the analyzer. I therefore do not wish to be limited to the embodiments shown in the drawing and described in the specification and aim in the following claims to cover all modifications and changes which fall within the true spirit and scope of the invention.

What is claimed is:

1. A refrigeration system including a source of vaporous fluid, a condenser, a cooling element, a conduit including a liquid trap for conducting vapor from said source to said cooling element, said trap being arranged to receive liquid, means to remove liquid from said trap to permit flow of vapor through said conduit to said cooling element, and means embodied in said system capable of functioning immediately when sufficient liquid is removed from said trap to cause all of the vapor from said source to flow through said conduit.

2. A refrigeration system including a source of vaporous fluid, a rectifier, a condenser, a cooling element, a conduit including a liquid trap for conducting vapor from said source to said cooling element, means for conducting liquid to said trap from said rectifier, and means for removing liquid from said trap to permit flow of vapor through said conduit to said cooling element.

3. A refrigeration system including a source of vaporous fluid, an analyzer, a condenser, and a cooling element connected in series relation in the order named, a conduit including a liquid trap for conducting vapor from said source to said cooling element, said trap being arranged to receive liquid, and means to remove liquid from said trap to permit flow of vapor through said conduit to said cooling element, said analyzer containing absorption liquid to form a liquid seal whereby all of the vapor from said source flows through said conduit when liquid is removed from said trap.

4. A method of refrigeration which includes maintaining a supply of vaporous fluid, flowing vapor from said supply to a place of condensation, causing such vapor normally to pass through liquid before reaching said place of condensation, condensing vapor to liquid at said place of condensation, evaporating condensed liquid to produce a refrigerating effect, trapping liquid, releasing the trapped liquid to cause transfer of vapor from said supply into the presence of evaporating condensed liquid to cause rapid rise in temperature and melting of any frost which may have formed due to said refrigerating effect, and utilizing the liquid through which vapor normally passes to block flow of vapor from said supply to said place of condensation when vapor is transferred into the presence of evaporating condensed liquid.

5. A method of refrigeration which includes expelling vapor from liquid at a place of vapor expulsion, condensing expelled vapor to liquid at a place of condensation, evaporating condensed liquid to produce a refrigeration effect, trapping liquid at a place of accumulation, conducting overflow liquid from said place of accumulation to said place of vapor expulsion, and removing trapped liquid from said place of accumulation to cause transfer of expelled vapor from said place of vapor expulsion into the presence of evaporating condensed liquid to cause rapid rise in temperature and melting of any frost which may have formed due to said refrigerating effect.

6. An absorption refrigeration system having a high temperature place of heating where vapors are generated and a low temperature place where heat is abstracted by evaporation of liquid to produce a refrigerating effect, the place of heat abstraction being subject to formation of frost or ice, structure providing a plurality of paths of flow for fluid from the place of heating to the place of heat abstraction, one of the paths of flow including a portion in which vaporous fluid from the place of heating is condensed to liquid and from which liquid flows to the place of heat abstraction and evaporation therein, another of the paths of flow being adapted to supply vaporous fluid from the place of heating into the presence of evaporating liquid at the place of heat abstraction to cause rapid rise in temperature and melting of any frost which may have been formed due to said refrigerating effect, means to control the supply of vaporous fluid to the place of heat abstraction, and means in said first path of flow to prevent flow of vaporous fluid to said portion in which the fluid is condensed to liquid when vaporous fluid is supplied to the place of heat abstraction.

7. In the art of refrigeration with an absorption refrigerating system including vaporizing fluid at a place of vapor expulsion, flowing the vaporized fluid to a place of condensation, condensing the vaporized fluid to liquid in said place of condensation, and flowing liquid from the place of condensation to a place of vaporization for vaporization therein to produce a refrigerating effect, the place of vaporization being subject to formation of frost or ice, the improvement which consists in also flowing vaporized fluid from the place of vapor expulsion to the place of vaporization to cause rapid rise in temperature and melting of any frost which may have been formed due to said refrigerating effect, and maintaining a liquid seal to block flow of vapor from said place of vapor expulsion to said place of condensation when flowing vaporized fluid to said place of vaporization.

8. In the art of refrigeration with an absorption refrigerating system including vaporizing fluid at a place of vapor expulsion, flowing the vaporized fluid to a place of condensation, condensing the vaporized fluid to liquid at the place of condensation and flowing liquid from the place of condensation to a place of vaporization for vaporization therein to produce a refrigerating effect, the place of vaporization being subject to formation of frost or ice, the improvement which consists in also flowing vaporized fluid from the place of vapor expulsion to the place of vaporization to cause rapid rise in temperature and melting of any frost which may have been formed due to said refrigerating effect, accumulating liquid at a place of accumulation in the path of flow of the vaporized fluid to stop flow thereof to said place of vaporization, removing liquid from said place of accumulation to permit flow of vaporized fluid to the place of vaporization, and stopping flow of vaporized fluid from the place of vapor expulsion to said place of condensation responsive to removal of liquid from said place of accumulation.

9. In the art of refrigeration with an absorption refrigerating system including vaporizing fluid at a place of vapor expulsion, flowing the vaporized fluid to a place of condensation, condensing the vaporized fluid to liquid at a place of condensation and flowing liquid from the place of condensation to a place of vaporization for vaporization therein to produce a refrigerating effect, the place of vaporization being subject to formation of frost or ice, the improvement which consists in also flowing vaporized fluid from the place of vapor expulsion to the place of vaporization to cause rapid rise in temperature and melting of any frost which may have been formed due to said refrigerating effect, flowing liquid in the system to a place of accumulation in the path of flow of the vaporized fluid to stop flow of the latter to said place of vaporization, conducting overflow liquid from said place of accumulation to said place of vapor expulsion, and removing liquid from said place of accumulation to permit flow of vaporized fluid to said place of vaporization.

10. A refrigeration system including a generator, a condenser and a cooling element, means including an analyzer for conducting fluid from said generator to said cooling element in a normal path of flow including said condenser, a by-pass connection for diverting fluid from said generator to said cooling element without passing through said condenser, and said analyzer containing liquid capable of blocking flow of fluid therethrough when fluid flows through said by-pass connection to said cooling element.

11. A refrigeration system including a generator and a cooling element, means for conducting fluid from said generator to said cooling element including a condenser and a chamber containing liquid through which said fluid passes before entering said condenser, a connection for conducting fluid from said generator to said cooling element without passing through said condenser, and means to control said connection, said last-mentioned means being so constructed and arranged that said chamber containing liquid is capable of blocking flow of fluid to said condenser when fluid flows through said connection.

12. A refrigeration system as set forth in claim 11 in which said means to control said connection includes a liquid trap.

13. A refrigeration system as set forth in claim 11 in which a portion of said connection is utilized to condense fluid flowing therethrough to fill said trap with liquid.

14. A refrigeration system as set forth in claim 11 in which condensate from a rectifier is conducted to said trap.

15. A refrigeration system including structure operable to maintain a supply of vaporous fluid, a condenser and cooling element, means including said condenser providing a first path of flow for fluid from said supply, a connection around said condenser providing a second path of flow for fluid from said supply to said cooling element, means to control flow of fluid through said connection, and a liquid seal in said first path of flow capable of blocking flow of fluid to said condenser when fluid flows through said connection.

CARL T. ASHBY.